United States Patent [19]

Guthrie

[11] 4,325,576

[45] Apr. 20, 1982

[54] ADJUSTABLE WHEELCHAIR HOLDING DEVICE

[75] Inventor: Dale H. Guthrie, High Point, N.C.

[73] Assignee: REB Manufacturing, Inc., Carey, Ohio

[21] Appl. No.: 191,385

[22] Filed: Sep. 29, 1980

[51] Int. Cl.³ .......................... B60N 1/02; B60P 7/08; B61D 45/00

[52] U.S. Cl. .......................... 296/65 R; 280/242 WC; 280/289 WC; 410/21; 410/51

[58] Field of Search ................ 188/2 F, 4 R, 4 B, 28, 188/32; 280/179 R, 242 WC, 289 WC; 296/19, 65 R; 248/500, 505; 410/3, 51, 21

[56] References Cited

U.S. PATENT DOCUMENTS

| | | | |
|---|---|---|---|
| 1,603,309 | 10/1926 | Bennett | 296/19 |
| 4,019,752 | 4/1977 | Leon et al. | 296/65 R |
| 4,027,747 | 6/1977 | Moorman, Jr. | 410/3 |
| 4,083,594 | 4/1978 | Tullock | 296/65 R |
| 4,093,303 | 6/1978 | Nelson | 296/65 R |
| 4,170,368 | 10/1979 | Southward et al. | 280/242 WC |
| 4,265,478 | 5/1981 | Korsgaard | 280/242 NC |

*Primary Examiner*—Richard A. Bertsch

*Attorney, Agent, or Firm*—Hugh Adam Kirk

[57] ABSTRACT

A device mounted on the floor or in the side wall of a vehicle for locking simultaneously both wheels of a wheelchair to prevent the chair from moving other than with the vehicle. The device comprises a horizontal bar located above the floor of the vehicle a distance equal to about the radius of the larger two wheels of a wheelchair and parallel to their axis, which bar has mounted thereon a separate pair of horizontal U-shaped brackets, relatively adjustable along the bar for engaging the tires and rims of the two large wheels of a wheelchair, when the chair is backed into the brackets. A single substantially vertical lever is pivoted between the brackets on the bar and is connected by links to oppositely sliding pins to open simultaneously the open sides of the U-brackets which are normally maintained closed by a spring attached to the lever. These locking or holding pins extend behind the rims and between the spokes of the wheels. The ends of a seatbelt may be attached, one end to each bracket, for also holding the person in the wheelchair as well as further holding the wheelchair to the vehicle.

10 Claims, 4 Drawing Figures

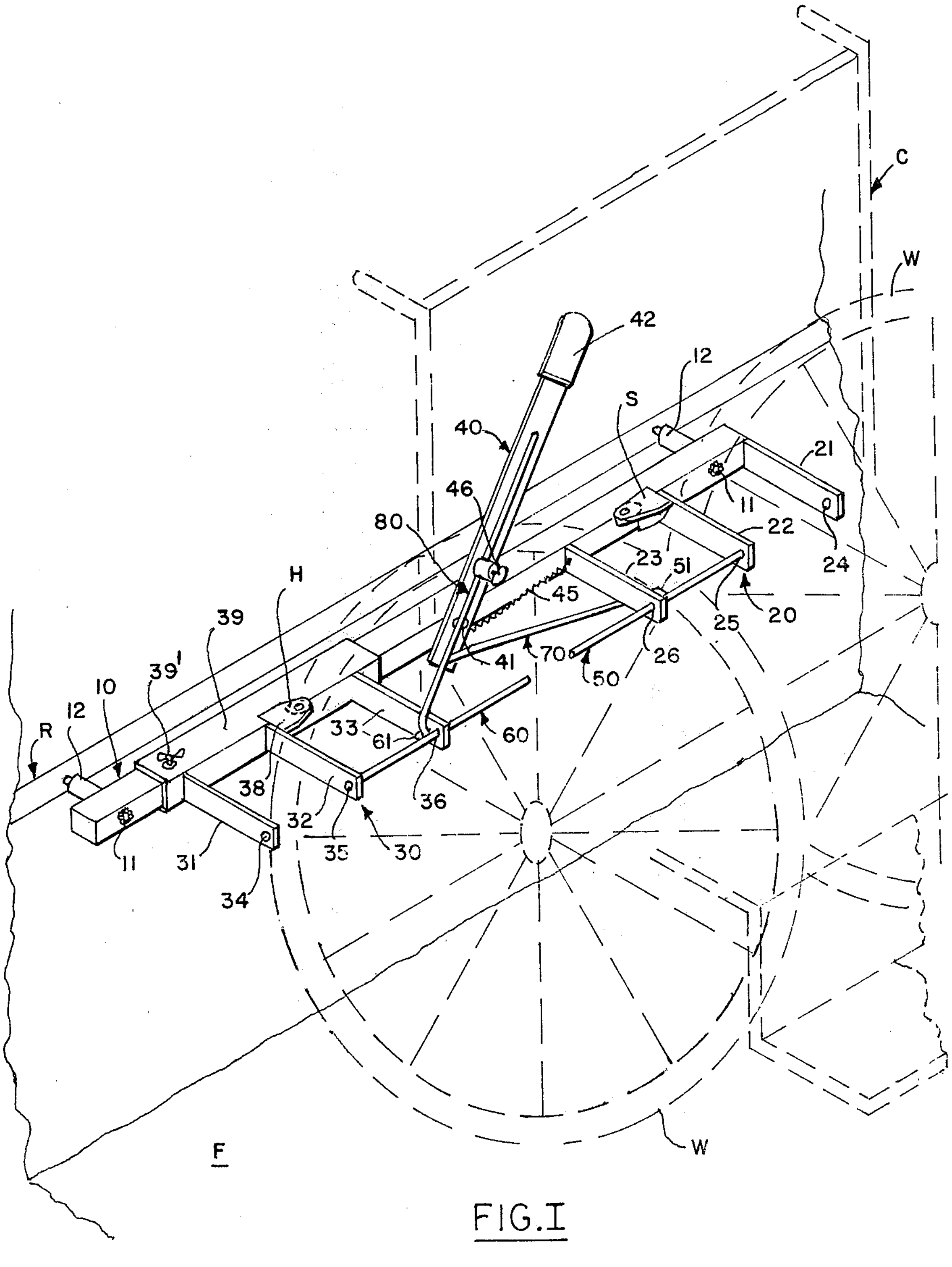
FIG. I

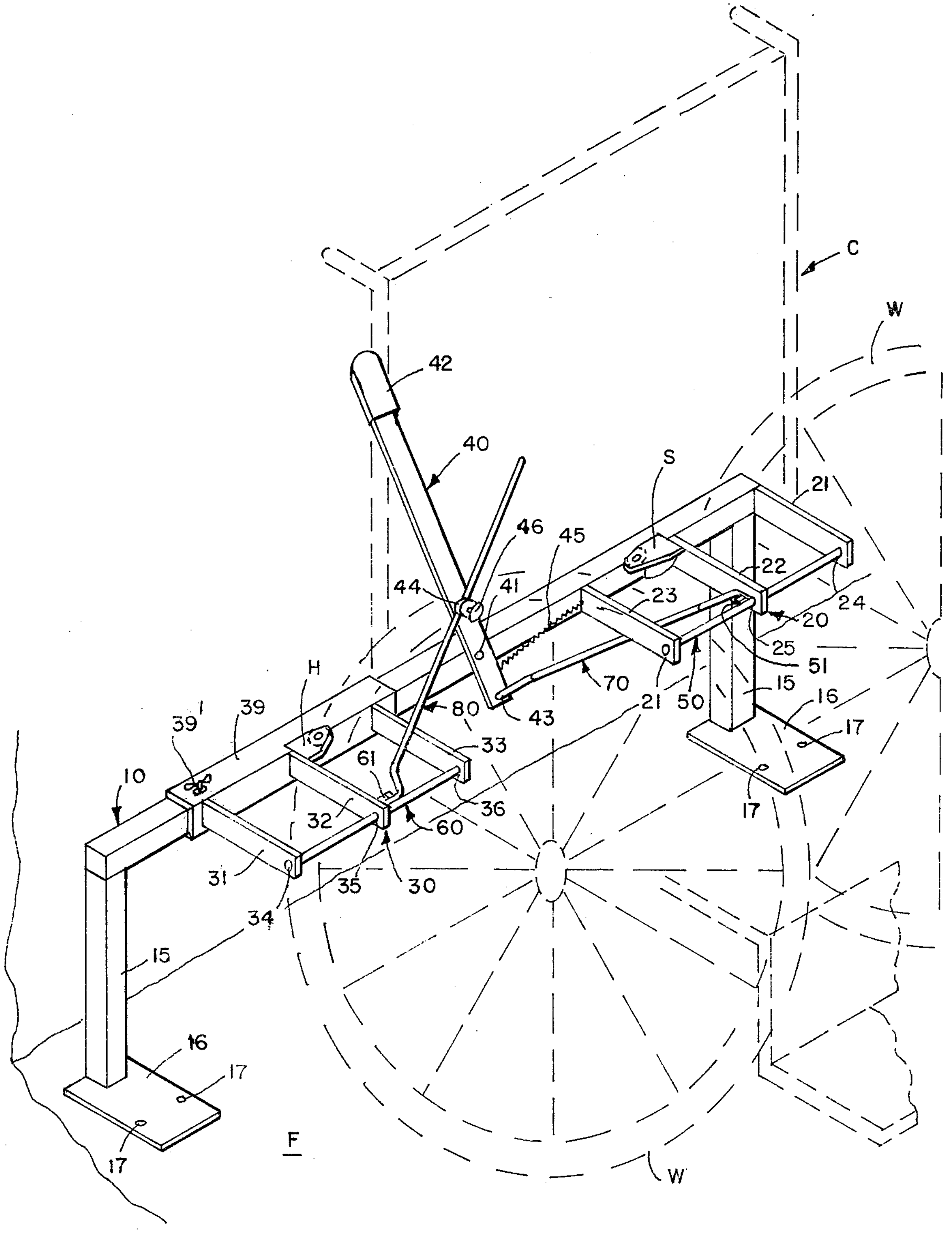
FIG. II

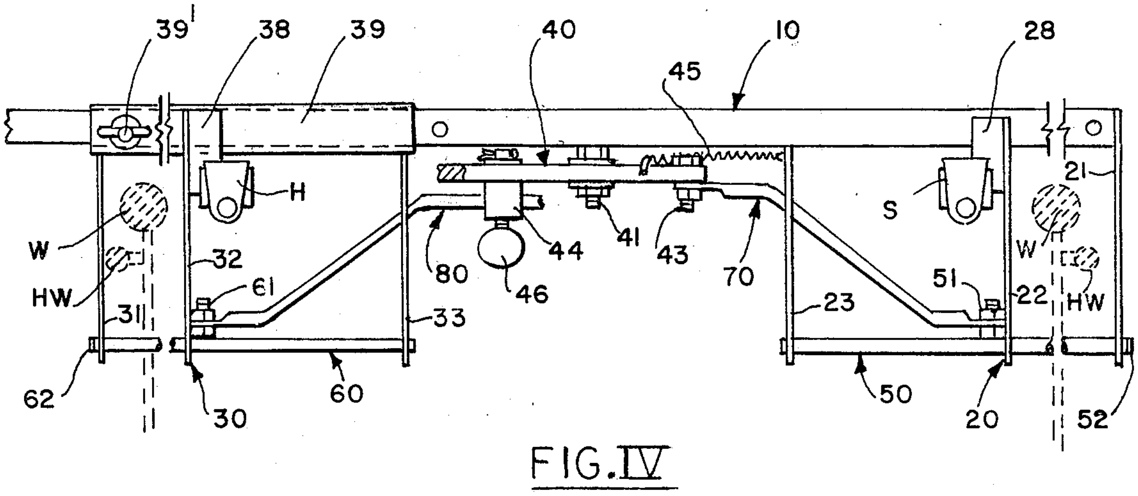
FIG. IV
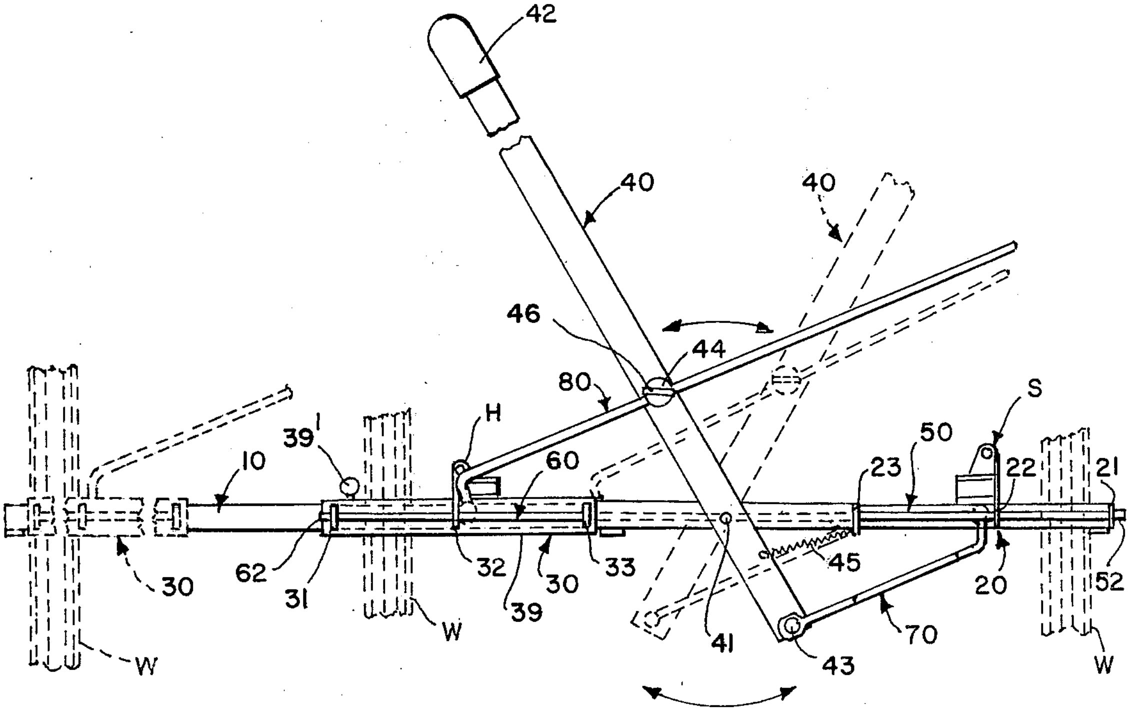
FIG. III

ADJUSTABLE WHEELCHAIR HOLDING DEVICE

BACKGROUND OF THE INVENTION

A plurality of parallel horizontal U-shaped brackets with removable pins across their open ends for holding the tires and rims of bicycles and bicycle-type wheels, have been known since before the turn of the century as evidenced by:

Lewis U.S. Pat. No. 608,464 of Aug. 2, 1898;

Leon et al. U.S. Pat. No. 4,019,752 of Apr. 26, 1977; and

Downing et al. U.S. Pat. No. 4,062,209 of Dec. 13, 1977.

Brackets that are adjustable along horizontal bars for holding wheelchairs in vehicles are also known as shown in:

Tullock U.S. Pat. No. 4,083,594 issued Apr. 11, 1978, and

Nelson U.S. Pat. No. 4,093,303 issued June 6, 1978.

Furthermore, it is known that pivoted levers are linked to oppositely slidable holding or anchoring pins for holding invalid carriages in vehicles as shown in:

Bennett U.S. Pat. No. 1,603,309 issued Oct. 19, 1926, and

Southward et al. U.S. Pat. No. 4,170,368 issued Oct. 9, 1979 (see FIG. 13).

However, none of these references disclose devices having the simplicity, versatility, adjustability and safety of applicant's device for locking both wheels of wheelchairs in a vehicle.

SUMMARY OF THE INVENTION

Generally speaking, the holddown or holding device of this invention for wheelchairs in vehicles comprises a fixed horizontal bar, parallel to and in substantially the same plane as the axle of the two large wheels of a wheelchair, which bar has two U-shaped horizontal parallel brackets for engaging the backs of both of the large wheels of a wheelchair and a lever means for simultaneously sliding pins between the spokes of these wheels for pinning the rims of the wheels in said brackets. The horizontal bar may be mounted on either a special stand therefor or bolted against a wall of the vehicle, preferably at a distance substantially equal to the radius of the large wheels that the brackets are supposed to hold. At least one of the brackets is longitudinally adjustable and clampable along the horizontal bar to compensate for different spacing between the wheels of different wheelchairs. The sliding pins for holding the rims of the wheels in the brackets may be guided through aligned holes at the ends of the legs of the U-shaped brackets. These sliding pins are operated by a single substantially vertical manual lever pivoted to the horizontal bar between the brackets and connected by separate oppositely movable links from opposite sides of the lever's pivot to each of the pins. This manual lever preferably is urged by a spring means to maintain the pins in their wheel-locking positions. The link between the lever and the pin on the adjustable bracket is also adjustable in its length such as having a slidable clamp connection at one of its pivoted ends. If desired, the brackets may be provided with mountings for and installation of a seatbelt with a reel on one bracket and a hook on the other for also holding the occupant of the wheelchair in place.

OBJECTS AND ADVANTAGES

It is an object of this invention to produce a simple, efficient, effective, safe, and economic device for holding both of the large wheels of a wheelchair anchored to the sidewall or floor of a vehicle.

Another object is to provide such a holding device which is adjustable for wheelchairs having different spacing between their two large spoke-type wheels.

Another object is to produce such an anchoring or holding device which is compact and is operated by one single lever that is normally urged into its locking position.

Still another object is to provide such a holding device to which may also be attached a seatbelt for holding both the occupant of the wheelchair, as well as the wheelchair, to the vehicle.

BRIEF DESCRIPTION OF THE VIEWS

The above mentioned and other features, objects and advantages, and a manner of attaining them are described more specifically below by reference to an embodiment shown in the accompanying drawings, wherein:

FIG. I is a perspective view of one embodiment of a holding device according to this invention shown mounted against the wall in a vehicle, and with the device in its open wheel-receiving position, a part of a wheelchair being shown in dotted lines in said device ready for locking thereto;

FIG. II is a view similar to that shown in FIG. I, but of an embodiment mounted on a stand on the floor of a vehicle and showing the locking device in its wheel-locking position;

FIG. III is a side elevational view of the moving parts of the locking device shown in FIGS. I and II, shown in full lines in their wheel-locked position, and in dotted lined in their wheel-unlocked position, and also in dotted lines to the left in an adjusted position of one bracket for wider wheels; and FIG. IV is a slightly enlarged plan view of those parts of the device shown in FIG. III in full lines.

DETAILED DESCRIPTION OF THE PREFERRED EMBODIMENTS

Referring to the figures, the device comprises a horizontal bar 10, a pair of similar horizontal first and second U-shaped brackets 20 and 30 mounted on said bar 10, a substantially vertical lever 40 pivoted to said bar 10 between said brackets 20 and 30, a pair of oppositely slidable pins 50 and 60 mounted on said brackets 20 and 30, respectively, and a pair of pivoted links 70 and 80 connected between said pins 50 and 60, respectively, and said lever 40, whereby operation of said lever 40 moves said pins 50 and 60 across and away from the open U-shaped ends of said brackets 20 and 30 to clamp and release simultaneously the rims of two large wheels W of a wheelchair C. The one bracket 30 is shown adjustable relative to the bracket 20 along the bar 10 to compensate for wheelchairs which have different widths between their wheels W.

The horizontal bar 10 is preferably of non-circular cross-section, such as rectangular or square, so that the adjustable bracket 30 slidable therealong will remain with its legs in a horizontal position parallel to the legs of the fixed bracket 20 at the other end of the bar 10. The bar 10 may be mounted by bolts 11 directly into the railing or sidewall R of a vehicle having a floor F, and this bar 10 may be spaced therefrom by sleeves 12 so that the bracket 30 may easily slide along the bar between its anchoring bolts 11. The bar 10, however, may be mounted on separate stands or legs 15, as shown in FIG. II, one of which legs 15 may be welded to each end of the bar 10. Each leg 15 may be provided with feet plates 16 having apertures through which bolts or screws 17 may be employed for anchoring the legs to the floor F of the vehicle.

Since the brackets 20 and 30 are movable relative with respect to each other, one of these brackets, namely 20, may have its legs 21 and 22, projecting orthogonally horizontally outwardly from the bar 10 away from the wall or rail R, welded directly to the bar 10 so as to be formed integral therewith. In addition to the two parallel legs forming the U-shaped portion of the bracket 20, there may be provided an additional parallel leg 23, also welded to the bar 10, which acts as a guide for the sliding pin 50 when the pin is in its retracted or open position as shown in FIG. I. The outer ends of these legs 21, 22 and 23 may herein be provided with aligned apertures 24, 25, and 26, respectively, through which the locking pin 50 is guided, held and slides. Also mounted on the bracket 20 and welded to the bar 10 and leg 22 may be a plate 28 (see FIG. IV) upon which may be attached one end or reel portion of a seatbelt S.

The other and adjustable bracket 30 is similarly provided with parallel legs 31 and 32 forming the U-shaped portion of the bracket 30 for holding the rim of a wheel W. This bracket 30 also may have an additional parallel leg 33 corresponding to leg 23 for guiding the locking pin 60 when it is in its unlocking position as shown in FIG. I. The ends of each of the legs 31, 32, and 33 are also provided with aligned apertures 34, 35 and 36, respectively, for guiding and journalling the sliding locking pin 60. Welded to the leg 32 there may be also a plate 38, similar to plate 28, to which the other end or hook portion H of the seatbelt S may be attached. This plate 38 also may be welded to the tubular sleeve 39 which surrounds, conforms, and slides all along the bar 10, and to this sleeve each of the legs 31, 32, and 33 are parallelly connected, such as by welding. In addition thereto, the sleeve 39 is provided with a thumb screw 39' for anchoring it to the bar 10 when its proper position or location is found so that its U-shaped aperture between the legs 31 and 32 is the same distance from the U-shaped aperture between legs 21 and 22 of bracket 20, as the distance between the two wheels W on the wheelchair C. Once this distance is determined, the thumb screw 39' can be used to clamp and hold the position of the bracket 30 with respect to that of bracket 20.

Intermediate the brackets 20 and 30, and preferably closer to the bracket 20 than 30, there is pivoted on a horizontal pivot, means 41 for a substantially vertical manual lever 40 which may have a handgrip 42 at its upper end. This pivot means 41 may comprise a bolt, which is welded horizontally outwardly from the horizontal bar 10 parallel to the legs 21, 22, 23, 31, 32 and 33 and is provided with washers and nuts for easy assembly of pivot 41 and oscillating movement of the lever 40 to either side of the vertical as shown in full and dotted line positions in FIG. III. The pivot 41 for the lever 40 is, however, spaced from the lower end of the lever 40 at which lower end is provided an additional pivot 43 and equal distance from the pivot 41 and on the other side of the pivot 41 is provided a third pivot 44 on the lever 40. This upper pivot 44 comprises herein a diametrically apertured cylinder 45 with a thumb screw clamp 46 for clamping the link 80 therein at a distance along its length corresponding to the adjustment and position of the bracket 30 from the pivot 41. Since this bracket 30 is adjustable along the bar 10, its corresponding link 80 must also be adjustable. This adjustment, however, instead of being at the pivot 44 may be along the link 80 itself, such as a telescopic link, or at the other end of the link, as desired, without departing from the scope of this invention.

The pivots 51 and 61 for the outer ends of the links 70 and 80 may be located from near the center to the adjacent ends of the locking pins 50 and 60, respectively, which pivots 51 and 61 may be provided by welding the heads of bolts onto the sides of the locking pins 50 and 60 so that their axes are parallel to the axes of the pivots 43 and 44 and 41. Thus, the fixed length link 70 is pivoted at its ends to the pivots 51 and 43 of the locking pin 50 and lower end of lever 40, respectively, and the adjustable length link 80 is pivoted at one end to the pivot 61 on locking pin 60 and is clamped in the pivot 44 along its opposite end by thumb screw 46.

In order to insure that the locking pins 50 and 60 are urged or normally held in their locking position shown in FIGS. II, III and IV, there is shown a helical tension spring 45 connected between the lever 40 on one side of the pivot 41 and the bar 10 or fixed bracket 20, so that action of the lever 42 to open the U-shaped portions of the brackets 20 and 30 to receive the wheels W of a wheelchair, is always against the action of a resilient means or spring 45.

The U-shaped portions of the brackets 20 and 30 are sufficiently large so that not only can the tires and rims of the wheels W fit therein, but also the hand-wheel HW (see FIG. IV) adjacent thereto. The spokes of the wheels used on wheelchairs are sufficiently small so that they do not interfere or block the operation of the pins 50 and 60, in that the rounded or tapered ends 52 and 62 of these pins easily deflect the spokes, if contact is made with them, without breaking or interfering with their function.

It is to be understood that the legs 23 and 33 are not essential in that the legs 32 may have other brackets or sleeve means at their outer ends for guiding the pins 50 and 60 without departing from the scope of this invention when the pins are in their retracted position as shown in FIG. I.

Furthermore, it should be understood that the bar 10 may be long enough to provide a plurality of brackets, and both of the brackets 20 and 30 for the next adjacent chair may be adjustable like the bracket 30 for sliding along the bar and being clamped thereto by the thumb screw 39. In such an embodiment, the pivot 41 for the lever 40 may be fixed at an average distance between the extra two adjustable brackets, and both links 70 and 80 may be adjustable as the link 80, without departing from the scope of this invention.

While there is described above the principles of this invention in connection with specific apparatus, it is clearly understood that this description is made only by way of example and not as a limitation to the scope of this invention.

I claim:

1. A holddown device for the two wheels of a wheelchair comprising:

(A) a horizontal bar anchored to said vehicle, (B) a first U-shaped bracket having its legs extending horizontally and orthogonally to said bar for engaging one wheel of a wheelchair, which bracket is fixed to said bar, (C) a second U-shaped bracket similar and parallel to said first U-shaped bracket but slidable along said bar and having means for clamping it to said bar so that its legs will engage the other wheel of the wheelchair, (D) a separate pin means for each bracket that is horizontally slidable to close and open the open ends of the "U" of said bracket so that the wheels of the wheelchair may enter said U-shaped brackets and thereafter be locked therein by said pins, (E) a vertical lever pivoted intermediate its ends to said bar intermediate said brackets, (F) a first link means pivoted between said lever and said pin in said first fixed U-shaped bracket, and (G) a second link means pivoted to said pin in said second U-shaped bracket, and to said lever opposite the pivot of said lever from said first link means, said second link means being adjustable longitudinally, whereby said lever simultaneously slides said pins in opposite directions.

2. A holddown device according to claim 1 including means for urging said pins into their wheel-locking position.

3. A holddown device according to claim 2 wherein said urging means comprises a spring attached to said lever.

4. A holddown device according to claim 1 including means adjacent said U-shaped brackets for attaching a strap for extending around the wheelchair and occupant therein.

5. A holddown device according to claim 1 wherein said first link means is attached to the lower end of said vertical lever.

6. A holddown device according to claim 1 wherein said pivots for said link means on said lever are equally spaced from the pivot of said lever.

7. A holddown device according to claim 1 wherein said U-shaped brackets have means for guiding said pin means when they are away from their wheel-locking positions.

8. A holddown device according to claim 7 wherein said U-shaped brackets are E-shaped brackets with the two outer arms forming said U's.

9. A holddown device according to claim 7 wherein said brackets have aligned apertures in the free ends of their legs for said pin means.

10. A holddown device according to claim 1 wherein said links are pivoted to said pins between the ends of said pins.

* * * * *